United States Patent
Oweis et al.

[11] Patent Number: 5,972,532
[45] Date of Patent: Oct. 26, 1999

[54] CURRENT COLLECTION THROUGH THE ENDS OF A SPIRALLY WOUND ELECTROCHEMICAL CELL

[75] Inventors: Salah Oweis, Ellicott City; Guy Chagnon, Columbia; Peter Alunans, Baltimore; Antonio Romero, Parkton, all of Md.

[73] Assignee: Saft America, Inc., Valdosta, Ga.

[21] Appl. No.: 09/071,191

[22] Filed: May 4, 1998

[51] Int. Cl.$^6$ .................................................. H01M 4/02
[52] U.S. Cl. ............................................ 429/94; 429/211
[58] Field of Search ...................................... 429/94, 211

[56] References Cited

U.S. PATENT DOCUMENTS 5,525,441  6/1996  Reddy et al. ............................ 429/127
5,635,312  6/1997  Yanagisawa et al. ..................... 429/94

*Primary Examiner*—John S. Maples
*Attorney, Agent, or Firm*—Sughrue, Mion, Zinn, Macpeak & Seas, PLLC

[57]  ABSTRACT

An electrochemical cell, including a jelly-roll type electrode stack, and a method for making such cell. The electrochemical cell includes folded electrode portions which form a plane recessed from the end of the electrode stack. The folded electrode portions are preferably formed by making pairs of slits in the electrode end and bending over the electrode portions between each pair of slits. The recessed plane forms a large area to which a current collection tab is subsequently connected. A coating may be applied to the folded portions of the electrode to further increase the contact area with the current collection tab by eliminating the slight variations in the recessed plane which are due to the overlap of the folded electrode portions.

26 Claims, 2 Drawing Sheets

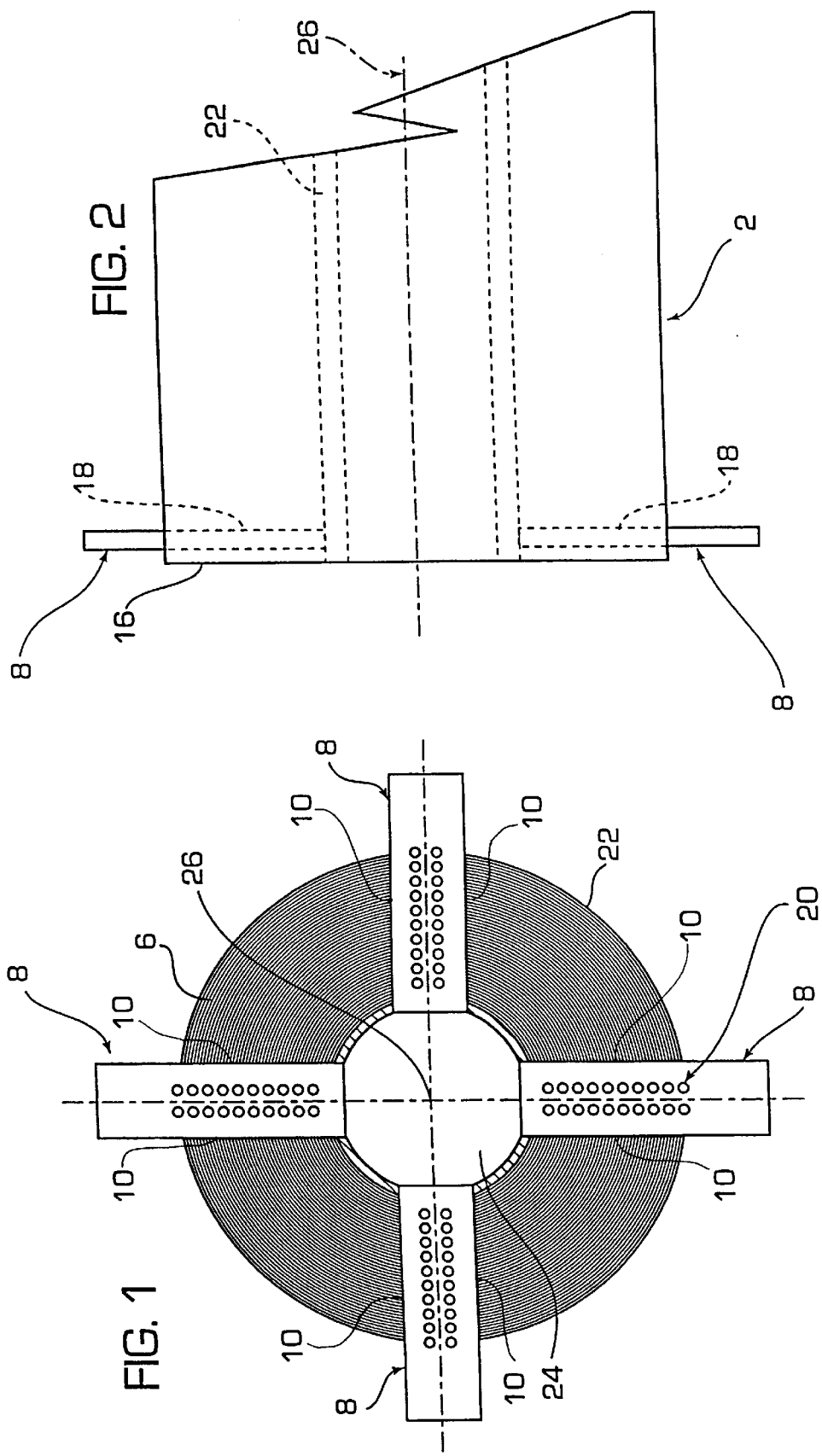

CURRENT COLLECTION THROUGH THE ENDS OF A SPIRALLY WOUND ELECTROCHEMICAL CELL

BACKGROUND OF THE INVENTION

In general, this invention is directed to an electrochemical cell exhibiting improved current collection capability, and a method of making such an electrochemical cell. In one instance the electrochemical cell is a spirally wound cell, but the cell can be of any variety.

In a typical spirally wound electrochemical cell, a first conductive layer and a second conductive layer are separated by insulation. The conductive layers are offset from one another, so that the first conductive layer extends beyond the insulation and the second conductive layer in one direction. The second conductive layer extends beyond the insulation and the first conductive layer in an opposite direction. The layers are then rolled together to form a jelly-roll style electrode stack wherein the first conductive layer forms a positive electrode at one end of the stack, and the second conductive layer forms a negative electrode at a second end of the stack opposite the stack first end.

A first spiral space is defined in the first end of the jelly-roll by the portion of the first conductive sheet which is not layered with either insulation or the second conductive sheet. A second spiral space is defined in the second end of the jelly-roll by the portion of the second conductive sheet which is not layered with either insulation or the first conductive sheet. The positive and negative electrodes are then connected to terminals of a fluid tight casing for use as a battery. Before the casing is sealed shut, an electrolyte is put into the casing surrounding the electrodes. The electrolyte aids in the development of an electric potential difference between the electrodes in the cell.

In the typical electrochemical cell, the electrodes are connected to the terminals of the battery by connection portions extending from the electrode sheet itself, or by tap straps. Another method of connection is to edge weld the connection portions to the spiral end of the electrodes. These methods, however, suffer the problem of only being capable of carrying a limited amount of current from the cell. The tabs do not connect to a sufficient area of the electrode to carry larger currents associated with bigger batteries. Moreover, welding additional connection portions presents problems in manufacture of the batteries, such as limiting the area by which electrolyte can be introduced into the electrode, and increasing the cost as well as production time for the battery.

SUMMARY OF THE INVENTION

One object of the invention is to improve the current collection capacity from an electrochemical cell by overcoming the problems associated with the present current collection methods.

Another object of the invention is to improve the current collection capacity from an electrochemical cell by providing an improved method of attaching a current collection tab to an electrode, which may be a spirally wound electrode. The invention also includes an electrochemical cell having one or more current collection tabs attached thereto in such a manner as to increase the current collected from the cell.

Yet another object of the present invention is to improve the current collection capacity from an electrochemical cell by providing increased contact area between a current collection tab and an electrode, including a spirally wound electrode. By increasing the contact area between each contact tab and the electrode, fewer contact tabs are necessary which thus leaves sufficient space on the electrode for introduction of electrolyte.

The present invention achieves these and other objects by slitting selected portions of the electrode that are not covered by insulation. Slits are made in the end of the electrode stack and extend down through the electrode in a direction parallel to the electrode stack longitudinal axis, and in a radial direction from the periphery of the electrode stack towards the longitudinal axis. The slits may be either parallel to one another, converge, or diverge. The slits do not extend the entire length of the electrode portion which is uncovered by insulation. The slits define a tab connection portion of the spirally wound electrode therebetween which is subsequently folded over so that the sections of the electrode extend in a radial direction. The folded portions of the electrode can extend substantially perpendicular to the longitudinal axis of the electrode. The folded portions of the electrode may extend from their bend toward the longitudinal axis, that is in an inward direction. Alternatively, the folded portions can extend from their bend in a direction away from the longitudinal axis, i.e., in an outward direction. In either case, the folded portions of the electrode extend in a radial direction and can be substantially perpendicular to the longitudinal axis.

The folded portions of the electrode define a contact tab connection portion. Each electrochemical cell electrode can have one or more contact tab connection portions. Each contact tab connection portion includes a plane which is recessed from the end plane of the electrode stack. The plane of the contact tab connection portion can be substantially parallel to the end plane of the electrode stack, but can also form an angle therewith. The folded portions may be covered by a conductive material in order to provide a flatter surface to which the contact tab is connected. For example, a thermally sprayed coating of conductive material that is compatible with the material of the electrode can be sprayed onto the folded portions before the contact tab is attached.

A contact tab, of conductive material, is connected to each connection portion by any suitable method. The contact tab can be made either of the same or different material than the electrode to which it is attached. The contact tab should have a geometry and dimensions compatible with the electric current to be collected from the respective cell.

One suitable method for connecting the contact tab to the connection portion is welding, for example sonic welding or laser welding. However, laser welding is preferred. Proper precautions are taken so that the temperature of the electrode stack can be controlled to prevent the insulation from being heated beyond its melting point. Further, high electric conductivity is achieved between the current collection tab and the electrode while minimizing the internal resistance drop between the electrodes, i.e., shorts between the positive and negative electrodes are minimized. When a conductive coating is applied to the folded portions of the electrode, the current collection tab is welded directly to the conductive coating. The coating layer creates a flat surface with controlled height. This helps to fix the welding process parameters, speed up the welding process, and improve the quality of the weld.

Further, in the case of a spirally wound electrode, the invention can include a hollow thin walled mandrel around which the conductive sheets and insulation are wound to form the jelly-roll. This construction results in a tubular cell having a hollow core. The diameter of the hollow mandrel is selected according to the winding, thermal, and fabrication considerations of the cell. The hollow mandrel can then be welded to top and bottom covers of the cell casing, which act as thermal links between the outer case of the cell and the electrode stack. The hollow core design improves the dissipation of heat generated along the central core of the cell. The relatively large radius of the tubular cell minimizes the cracking of any coated layers on the electrodes of the jelly-roll.

Additionally, the hollow mandrel can have longitudinal grooves on its outer surface, i.e., the surface on which the jelly-roll is wound. The longitudinal grooves on the outer surface of the tube help to properly evacuate and fill the cell during the electrolyte filling process.

The electrochemical cell of the present invention may be, but is not limited to, a rechargeable lithium-ion cell of either the standard or scaled up high power type. The substrate material for the positive and negative electrodes can be any suitable material. For example, in a lithium-ion cell the positive electrode is made of aluminum and the negative electrode of copper. The current collection tabs are made of a material that is compatible with that of the respective electrode. For example, in a lithium-ion cell, an aluminum current collection tab would be used with the aluminum electrode whereas a copper or nickel current collection tab would be used with the copper electrode.

The method of the present invention may be used in manufacturing other types of cells including, but not limited to, nickel metal hydride cells and nickel cadmium cells. Also, the method of the present invention can be used on electrode stacks which are not spirally wound. Further, the method of the present invention can be practiced on any size of cell, but is particularly useful in manufacturing cells for electric vehicles.

The foregoing objects of the present invention, together with the features and advantages thereof, will be made apparent from the following description, in which like reference characters designate the same or similar parts throughout the drawings.

BRIEF DESCRIPTION OF THE DRAWINGS

FIG. 1 is an end view of a spirally wound jelly-roll electrode stack having current collection tabs connected thereto.

FIG. 2 is a partially cut away side view of a spirally wound jelly-roll electrode stack having current collection tabs connected thereto.

DETAILED DESCRIPTION OF THE INVENTION

Figure 3:
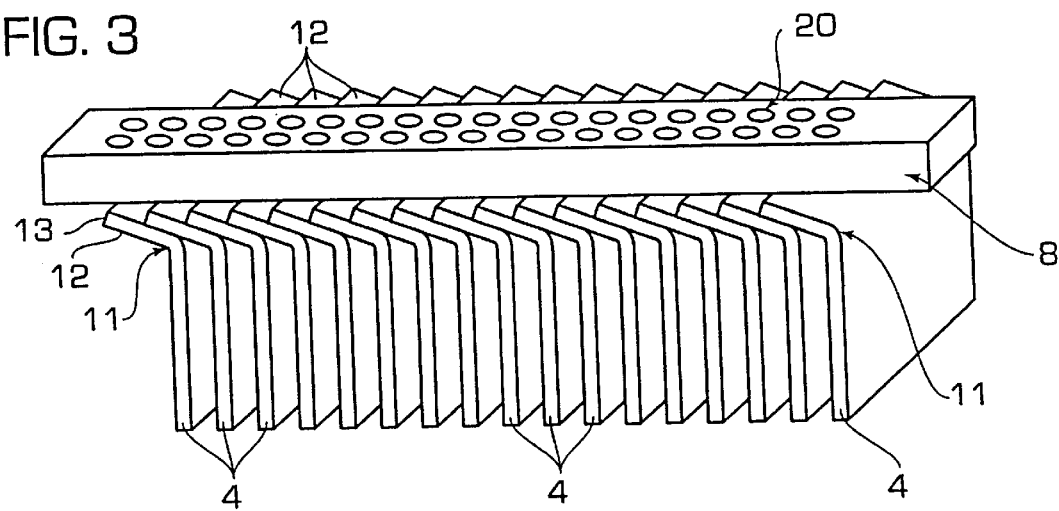
FIG. 3 is a blown up view of a current collection tab and the end portion of an electrode stack, showing the connection therebetween.

The present invention includes both an electrode stack having improved current collection characteristics, and a method for making an electrochemical cell having improved current collection from its electrode stack. First, the electrode stack 2 of an electrochemical cell of the present invention will be described. Subsequently, a method for making such an electrochemical cell will be set forth.

A first embodiment of an electrochemical cell of the present invention includes a jelly-roll type electrode stack 2. The jelly-roll electrode stack 2 includes a first electrode 4 and a second electrode (not shown) separated by insulation. The electrodes extend from opposite sides of the jelly-roll stack. The electrode ends as well as their connection to the current collection tabs 8 are similar, and therefore only one end of the electrode stack will be described.

FIG. 1 shows one end 6 of a spirally wound electrode which forms a part of a jelly-roll electrode stack 2. The electrode stack 2 has current collection tabs 8 attached thereto by welds 20, however, any suitable means can be used to attach the current collection tabs. The welds 20 can be made, for example, by spot welding with a sonic or laser welder but are preferably made by laser welding. The current collection tabs 8 are connected to a connection portion of the electrode stack which is recessed below the electrode stack end 6. The electrode stack end lies in a plane 16. Tabs 8 are connected to the electrode stack in a plane 18 which is closer to the middle of the electrode stack than is the plane 16. The tabs 8 can extend at any angle to the electrode stack longitudinal axis 26 but are preferably substantially perpendicular thereto. Although four tabs are shown in FIG. 1, any number of tabs can be employed. The number of tabs on the second end of the electrode stack can be the same as, or different from, the number of tabs on the first end of the electrode stack.

FIG. 3 shows, in a blown up manner, the area of connection between the electrode 4 and a current collection tab 8. As seen in FIG. 3, the ends of electrode 4 are folded over so that they form an increased area for connection to the tab 8. The folded portions 12 of the electrode end extend in the radial direction of the electrode stack and are formed so that the bend 11 in the electrode is farther from the electrode longitudinal axis 26 than is the electrode end 13. Alternatively, the folded portions 12 can be formed so that the bend 11 in the electrode is closer to the electrode longitudinal axis 26 than is the electrode end 13. In either case, the folded portions 12 form a plane 18 for connection of the tab 8. The plane 18, as described above, is recessed toward the interior of the cell from the end plane 16 of the electrode stack.

By providing the electrochemical cell with folded portions 12, a large surface area is formed from which current can be collected. In a typical electrochemical cell, a tab portion is connected to only the very edge portion of the wound electrode. In contrast, the present invention provides a connection to an increased area of the electrode 4. To further increase the contact area between the electrode and the contact tab, a coating can be provided on the folded portions 12 of the electrode 4. The coating provides a flat area for connection of the current collection tab 8 by filling in the slightly uneven surface formed by the overlap of the folded portions 12. The coating is made of a conductive material that is compatible with that of the electrode on which it is deposited, and with that of the current collection tab to which it is attached.

The electrochemical cell of the present invention can include a mandrel 22 around which the electrodes and insulation of the cell are wound to form the jelly-roll electrode stack. The mandrel 22 provides the cell with a hollow core 24 which assists in both heat dissipation and introduction of electrolyte.

Heat is generated by the process of attaching the tabs 8 to the electrode stack end 6, and also during operation of the battery. If heat builds up within the battery raising its temperature up to or beyond the melting point of the insulating material, then shorts can occur within the battery.

Shorts between the electrodes due to melted insulation can decrease the output capacity of the battery or even make it inoperable.

The mandrel can include longitudinal slits through the outer surface thereof. The slits aid in the evacuation of the battery in preparation for the introduction of electrolyte. The slits also aid in the introduction of electrolyte into the spiral spaces formed by the portion of each electrode which extends from each end of the jelly-roll stack.

Figure 5:
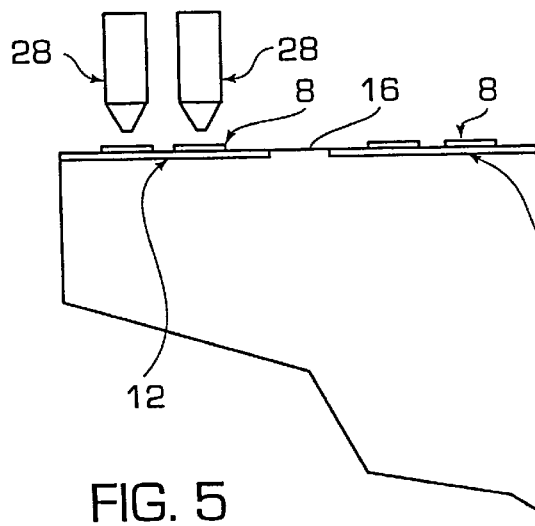
FIG. 5 is a partially cut away end view of the second type of electrode stack.
Figure 4:
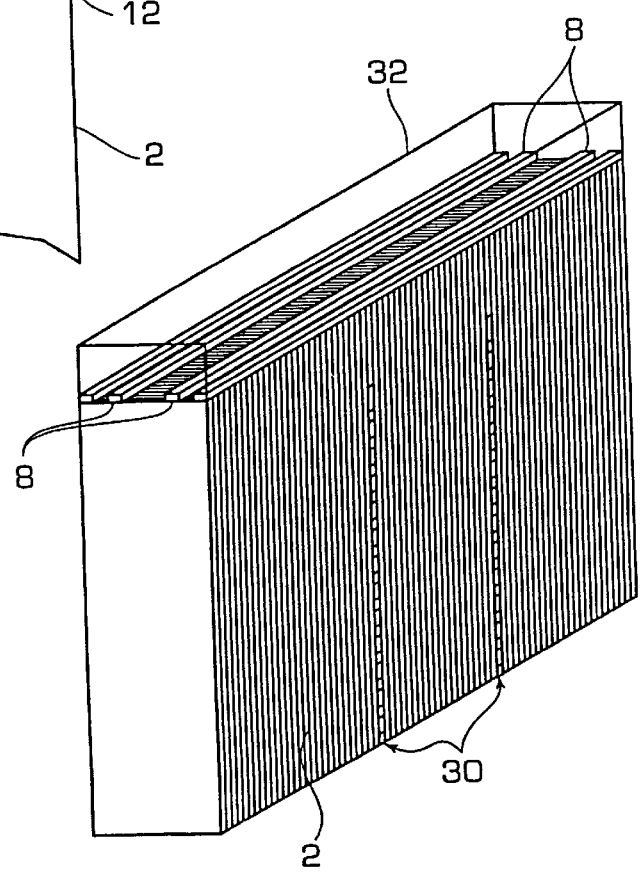
FIG. 4 is a plan view of a second type of electrode stack to which the method of the present invention is applied.

The method of connecting a contact tab to an electrode extending from the end of a stack will now be described. The method is useful in connecting current collection tabs to the ends of a jelly-roll style electrode stack, but can be used on other types of electrode stacks as well, for example a rectangular electrode stack as shown in FIGS. 4–5. However, the method will be described in conjunction with a jelly-roll type electrode stack with the understanding that one of ordinary skill in the art would readily envisage how to use the method on differently shaped electrode stacks.

An electrode stack 2 is formed so that one electrode 4 extends from one end of the jelly-roll to form an end 6, and a second electrode extends from the other end of the jellyroll. A slit 10 is then made in the end of one electrode, on the portion thereof which is not covered by insulation or the other electrode, so as to extend from the end of the electrode stack 6 towards the opposite end of the stack and so as to extend in a radial direction across the end of the electrode. Subsequently, another slit 10 is made near the first slit so as to form a pair of slits. This part of the process is repeated to form a pair of slits for each desired current collection tab.

Each slit 10 is shown as substantially parallel to the other slit of the pair, but such configuration is not necessary. The slits 10 of a pair can either converge or diverge as they extend from the outer periphery of the electrode stack towards the longitudinal axis 26. However, it is preferred to form the slits of each pair as substantially parallel to one another and spaced at a distance approximately equal to or slightly larger than the width of the current collection tab. By matching the distance between the slits 10 of a pair to the width of the tab 8, or slightly larger, a sufficient contact area is formed while leaving the rest of the electrode end unmodified for readily accepting electrolyte. The slits 10 can be made one at a time, simultaneously, or by any combination of simultaneous and sequential formation.

Each pair of slits defines a portion of the electrode 4 which is then bent down so as to form a plane 18 that is recessed from the plane 16 which contains the end of the electrode stack 6. The plane 18 is shown as substantially perpendicular to the longitudinal axis 26 of the cell, but can be formed at any angle thereto. To form the plane 16 at an angle to the longitudinal axis 26, the slits in the electrode end are made deeper at one radial location than another. For example, the slits could be deeper near the center of the electrode stack and gradually become shallower as they extend to the outer periphery of the electrode stack. Alternatively, the slits can be deeper near the outer periphery and shallower near the center of the electrode stack.

The folded portions 12 of the electrode can be formed so that the bend 11 in the electrode is closer to the longitudinal axis 26 of the electrode stack than is the end 13 of the electrode. Alternatively, the folded portions 12 of the electrode can be formed so that the bend 11 in the electrode is farther from the longitudinal axis 26 of the electrode stack than is the end 13 of the electrode.

Then, once the plane 18 is formed, a current collection tab 8 is attached thereto by laser spot welding. A welding electrode 28 is used to form the spot welds 20 which attach the tab 8 to the folded portions 12 of the electrode 4 which lie in plane 18. Alternative methods of attaching the current collection tabs can be used, such as sonic welding.

To increase the contact area between a tab 8 and the folded portions 12 of the electrode, a coating can be deposited onto the plane 18. The coating serves to smooth out the slightly uneven surface formed by the overlap in the folded portions 12. The coating is made of conductive particles which are compatible with the material from which the electrode and the current collection tab are made. The coating can be applied by any suitable method, but a thermal spray process is preferred.

The process for connection is then repeated for the other end of the jelly-roll to connect current collection tabs to the second electrode. Alternatively, the process can be carried out on each end of the jelly-roll simultaneously.

An alternative configuration of electrode stack is shown in FIGS. 4–5. In FIG. 4, the electrode stack 2 is rectangular, and is inserted into can or housing 32 which is then filled with electrolyte. The can 32 contains dividers 30 which prevent the long sides of the can from deforming thus permitting better control of the stack pressure during temperature cycling. Also, the dividers aid in maintaining the integrity of the can when it is filled with electrolyte at a high pressure.

In the rectangular configuration, the tabs 8 should be welded to the electrodes after they have been placed within the can 32. Welding the contact tabs after the electrode stack 2 is in the can 32 prevents the shifting of the plates in the stack, which facilitates fabrication of the electrochemical cell. Shifting of the plates is also prevented by minimizing the number of plates. Making the electrodes as long as the case height permits the minimum number of plates as well as permits the welding of the contact tabs after the electrodes are in the can.

The slits 10 in the electrode ends can be made to any depth as long as they do not contact the insulating material or the interior end of the other electrode. As shown in connection with the rectangular electrode stack 2, the slits in the electrode end are formed so that the plane formed by folded portions 12 is only slightly below the plane 16 which contains the end of the electrode stack 6. With such a configuration, the contact tabs 8 are allowed to protrude above the plane 16.

The foregoing description is merely exemplary and is not to be construed in a limiting sense. Modifications will be readily apparent to those of ordinary skill in the art, and are considered to be within the scope of the invention, which is to be limited only by the following claims.

We claim:

1. In an electrochemical cell which includes an electrode stack comprised of alternating conductive and insulating layers, said conductive and insulating layers extending in a first direction, wherein at least a first layer extends in said first direction from a first end of said stack, the improvement comprising:

a tab connection portion comprising at least a section of said first layer which is folded so as to extend in a direction substantially transverse to said first direction: and a current collection tab, having a longitudinal axis, connected to said tab connection portion such that said tab longitudinal axis extends in a direction substantially transverse to said first direction.

2. In an electrochemical cell which includes a jelly-roll type electrode stack comprised of alternating conductive and insulating layers, said electrode stack having a longitudinal axis, wherein at least a first layer comprises a spiral electrode and extends from a first end of said stack, the improvement comprising:

a tab connection portion including portions of first spiral electrode that are folded so as to extend in a radial direction.

3. The electrochemical cell according to claim 2, wherein said portions of first spiral electrode that are folded form a section that extends in a direction substantially perpendicular to said longitudinal axis.

4. The electrochemical cell according to claim 2, further comprising a pair of slits in said first spiral, wherein said tab connection portion is located between said slits.

5. An electrochemical cell comprising:

a first conductive sheet having a first end and a second end opposite to said first end;

insulation adjacent to said first conductive sheet so that said second end of said first conductive sheet is uncovered by said insulation;

a second conductive sheet having a first end, and a second end opposite to said first end of said second conductive sheet, wherein said second conductive sheet is adjacent said insulation so that said second end of said second conductive sheet is uncovered by said insulation and extends beyond said first end of said first conductive sheet;

a tab connection portion, wherein said tab connection portion includes at least one first conductive sheet section that is folded so as to extend across said insulation toward said second conductive sheet.

6. The electrochemical cell according to claim 5, wherein said first conductive sheet, said insulation and said second conductive sheet are rolled together to form a jelly-roll stack having a longitudinal axis such that said second end of said first conductive sheet forms a first spiral space, and said at least one first conductive sheet section extends across a portion of said first spiral space.

7. The electrochemical cell according to claim 6, wherein said second end of said second conductive sheet forms a second spiral space.

8. The electrochemical cell according to claim 6, further comprising a pair of slits in said first spiral, wherein said tab connection portion is located between said slits.

9. The electrochemical cell according to claim 8, wherein the slits which form said pair of slits are substantially parallel.

10. The electrochemical cell according to claim 6, wherein said tab connection portion lies substantially in a plane below said second end of said first conductive sheet.

11. The electrochemical cell according to claim 6, wherein each folded first conductive sheet section extends from a bend towards the longitudinal axis of the stack.

12. The electrochemical cell according to claim 6, further comprising a conductive tab, wherein said conductive tab is connected to said tab connection portion.

13. The electrochemical cell according to claim 12, wherein said conductive tab is connected to said tab connection portion by a weld joint.

14. The electrochemical cell according to claim 12, wherein said conductive tab is made of the same material as said first conductive sheet.

15. The electrochemical cell according to claim 6, further comprising a plurality of tab connection portions comprised of first conductive sheet sections that are folded SO as to extend across a portion of said first spiral space.

16. The electrochemical cell according to claim 15 further comprising a plurality of pairs of slits in said second end of said first conductive sheet, wherein a tab connection portion is located between each pair of slits.

17. The electrochemical cell according to claim 15, further comprising a conductive tab connected to each tab connection portion.

18. The electrochemical cell according to claim 15, further comprising a plurality of tab connection portions on said second end of said second conductive sheet.

19. The electrochemical cell according to claim 18, wherein the number of tab connection portions on said second end of said first conductive sheet is equal to the number of tab connection portions on said second end of said second conductive sheet.

20. The electrochemical cell according to claim 6, further comprising a hollow mandrel at the center of the jelly-roll stack around which said first conductive sheet, second conductive sheet, and said insulation are wound.

21. The electrochemical cell according to claim 6, further comprising a conductive coating on said tab connection portion.

22. The electrochemical cell according to claim 21, wherein said conductive coating is a thermally sprayed conductive coating.

23. The electrochemical cell according to claim 21, further comprising a conductive tab connected to said conductive coating.

24. The electrochemical cell according to claim 7, further comprising a second end tab connection portion, on said second conductive sheet, wherein said second end tab connection portion includes at least one second conductive sheet section that is folded so as to extend across a portion of said second spiral space.

25. The electrochemical cell according to claim 24, further comprising a pair of slits in the second end of said second conductive sheet, wherein said second end tab connection portion is located between said pair of slits.

26. The electrochemical cell according to claim 1, wherein said tab connection portion and said longitudinal axis of said current collection tab extend parallel to one another.

* * * * *